United States Patent
Champa et al.

(10) Patent No.: US 11,055,801 B2
(45) Date of Patent: Jul. 6, 2021

(54) VEHICLE DRIVER ACTIVITY LEVEL DETERMINATIONS AND ANALYSIS IN A FLEET MANAGEMENT SYSTEM

(71) Applicant: OMNITRACS, LLC, Dallas, TX (US)

(72) Inventors: Jeffrey A. Champa, Heath, TX (US); Kevin Haugh, Alexandria, VA (US)

(73) Assignee: OMNITRACS, LLC, Dallas, TX (US)

( * ) Notice: Subject to any disclaimer, the term of this patent is extended or adjusted under 35 U.S.C. 154(b) by 726 days.

(21) Appl. No.: 15/416,930

(22) Filed: Jan. 26, 2017

(65) Prior Publication Data

US 2017/0221169 A1    Aug. 3, 2017

Related U.S. Application Data

(60) Provisional application No. 62/289,077, filed on Jan. 29, 2016.

(51) Int. Cl.
| | |
|---|---|
| *G06Q 50/28* | (2012.01) |
| *G06Q 10/08* | (2012.01) |
| *G01C 21/20* | (2006.01) |
| *G01C 21/34* | (2006.01) |
| *G06Q 10/06* | (2012.01) |

(52) U.S. Cl.
CPC ............ *G06Q 50/28* (2013.01); *G01C 21/20* (2013.01); *G01C 21/343* (2013.01); *G01C 21/3484* (2013.01); *G06Q 10/06398* (2013.01); *G06Q 10/063112* (2013.01); *G06Q 10/063114* (2013.01); *G06Q 10/083* (2013.01)

(58) Field of Classification Search
CPC ..................................................... G06Q 50/28
See application file for complete search history.

(56) References Cited

U.S. PATENT DOCUMENTS

| | | | |
|---|---|---|---|
| 5,583,776 A | 12/1996 | Levi et al. | |
| 7,363,126 B1 | 4/2008 | Zhong et al. | |
| 8,204,684 B2 | 6/2012 | Forstall et al. | |
| 9,881,429 B2 * | 1/2018 | Davidson | G08G 1/052 |

(Continued)

FOREIGN PATENT DOCUMENTS

| | | |
|---|---|---|
| CN | 201805551 U | 4/2011 |
| EP | 1 811 481 A1 | 7/2007 |

(Continued)

OTHER PUBLICATIONS

Thakuriah P., Geers D.G. (2013) Technology Systems for Transportation System Management and Personal Use. In: Transportation and Information. SpringerBriefs in Computer Science. Springer, New York, NY. (Year: 2013).*

(Continued)

*Primary Examiner* — Thomas L Mansfield
(74) *Attorney, Agent, or Firm* — Arent Fox LLP

(57) ABSTRACT

Aspects of the present disclosure generally relate to optimizing vehicle driver performance and route travel. Specifically, tracking an activity level, such as a number of steps of a fleet vehicle driver may enable a fleet management system to increase both an efficiency of a particular fleet vehicle driver and an overall efficiency of the entire fleet. As such, the present disclosure provides for the determination of inefficiencies in a fleet vehicle driver stop location, and optimizes the routes for each fleet vehicle in a fleet management system based on the tracked information.

16 Claims, 5 Drawing Sheets

(56) References Cited

U.S. PATENT DOCUMENTS

| | | |
|---|---|---|
| 2005/0278062 A1 | 12/2005 | Janert et al. |
| 2012/0253548 A1 | 10/2012 | Davidson |
| 2013/0289846 A1* | 10/2013 | Mitchell ................. G06F 17/00 701/99 |
| 2013/0304348 A1* | 11/2013 | Davidson ............... G07C 5/008 701/99 |
| 2013/0317944 A1* | 11/2013 | Huang .................. G01S 5/0263 705/26.61 |
| 2014/0025295 A1 | 1/2014 | Paul et al. |
| 2014/0188431 A1* | 7/2014 | Barfield ............... G01C 22/006 702/160 |
| 2015/0254609 A1* | 9/2015 | Perez ..................... G06Q 10/02 705/5 |
| 2015/0324541 A1 | 11/2015 | Cheung et al. |
| 2017/0263059 A1* | 9/2017 | Davidson ........... G06Q 10/0631 |
| 2018/0041871 A1* | 2/2018 | Su ........................ H04W 4/021 |
| 2018/0130095 A1* | 5/2018 | Khoury ................ G08G 1/0129 |

FOREIGN PATENT DOCUMENTS

| | | |
|---|---|---|
| RU | 106589 U1 | 7/2011 |
| WO | WO 2008/004857 A1 | 1/2008 |
| WO | WO 2012/028690 A1 | 3/2012 |

OTHER PUBLICATIONS

International Search Report and Written Opinion issued in PCT/US2017/015497 dated Jun. 8, 2017.

May 22, 2019 Extended European Search Report issued in European Patent Application No. 17745047.5.

* cited by examiner

VEHICLE DRIVER ACTIVITY LEVEL DETERMINATIONS AND ANALYSIS IN A FLEET MANAGEMENT SYSTEM

CROSS-REFERENCE TO RELATED APPLICATION(S)

This application claims the benefit of U.S. Provisional Application Ser. No. 62/289,077, entitled "VEHICLE DRIVER ACTIVITY LEVEL DETERMINATIONS AND ANALYSIS IN A FLEET MANAGEMENT SYSTEM" and filed on Jan. 29, 2016, which is expressly incorporated by reference herein in its entirety.

BACKGROUND

Aspects of the present disclosure generally relate to fleet management systems, and more particularly to vehicle driver activity level determinations and analysis in a fleet management system.

In some fleet management systems, a fleet vehicle may be readily tracked to determine its efficiency, for example, related to other fleet vehicles. In particular, an amount of time driving a route (e.g., a "route time") may be tracked and analyzed to compare driver and/or vehicle and/or route performance, and/or to determine the most optimum route for future fleet vehicle assignments.

In contrast, however, an efficiency of the fleet vehicle driver as part of the route assignment, for example, at a given stop location, may not be taken into account. As such, improvements in managing route assignments in fleet management systems may be desired.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

In accordance with some aspects, a present method relates to optimizing route efficiency. The described aspects include receiving, at a network operations system, an indication of a number of steps of a fleet vehicle driver at a fleet vehicle stop location. The described aspects further include executing, at the network operations system, one or more analytics functions to determine one or more driver-specific stop location metrics based at least on the number of step of the fleet vehicle driver. The described aspects further include providing a report to one or more electronic devices based on executing the one or more analytics functions. The foregoing aspects are also described with respect to an apparatus and a non-transitory computer-readable medium.

In accordance with some aspects, a present method relates to fleet vehicle route optimization. The described aspects include retrieving a fleet vehicle driver profile of a fleet vehicle driver from a profile database, wherein the profile includes one or both of a history of fleet vehicle stop locations or a number of steps of the fleet vehicle driver at one or more respective fleet vehicle stop locations. The described aspects further include determining one or more routes including one or more fleet vehicle stop locations for the fleet vehicle driver based on the fleet vehicle driver profile. In addition, the described aspects include providing the one or more routes including one or more fleet vehicle stop locations to one or both of a communication device of a fleet vehicle or a communication device of the fleet vehicle driver.

The foregoing aspects are also described with respect to an apparatus and a non-transitory computer-readable medium.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Figure 1:
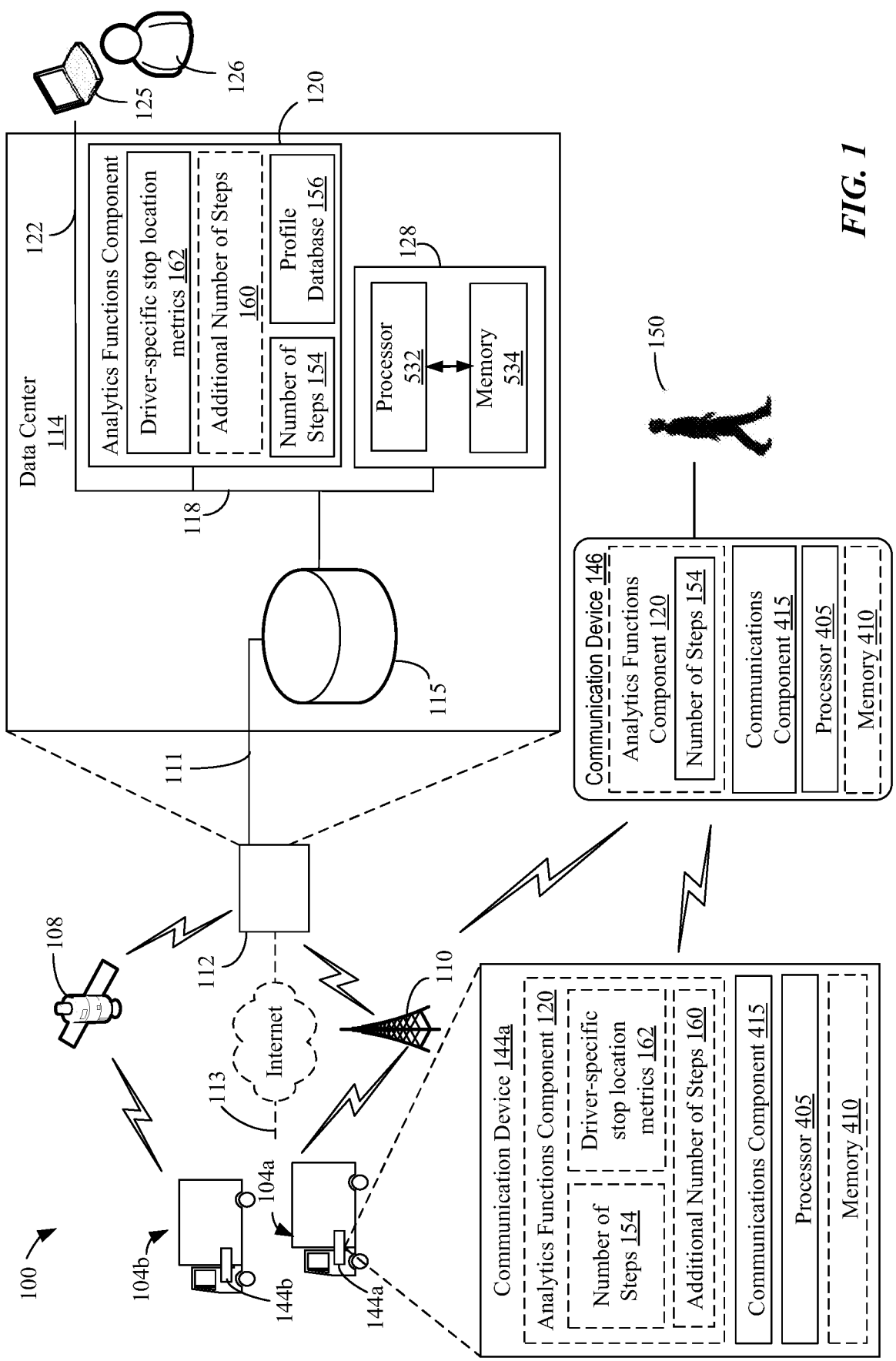
FIG. 1 is a functional block diagram of example elements of an aspect of a system including one or more communication devices and network operations system each configured to track a fleet vehicle driver activity level and optimize one or more routes.

Various aspects of the systems, apparatuses, and methods are described more fully hereinafter with reference to the accompanying figures. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the systems, apparatuses, and methods disclosed herein, whether implemented independently of, or combined with, any other aspect described herein. For example, an apparatus may be implemented or a method may be practiced using any number of the aspects set forth herein. In addition, the scope of the present aspects is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the aspects. The detailed description and figures are merely illustrative of the disclosure rather than limiting, the scope of the disclosure being defined by the appended claims and equivalents thereof.

The present aspects generally relate to vehicle driver activity level determinations and analysis in a fleet management system. Specifically, in some fleet management systems, a fleet vehicle driver may, during the course of a day, perform multiple pickups and/or deliveries at one or more stop locations along a corresponding route. Further, as the fleet vehicle driver performs the assignments or tasks, the fleet vehicle may be readily tracked (e.g., via GPS and/or onboard sensors). However, in some aspects, a given driver assignment or task includes not only a route traveled by the fleet vehicle, but also actions or activities undertaken by the fleet vehicle driver at the stop location to complete the task. For example, as part of the task (e.g., package delivery), a fleet vehicle driver may perform an activity that includes travelling outside of the vehicle a certain distance (e.g., to deliver a package from the fleet vehicle to a delivery location) and/or may encounter certain obstacles (e.g., walkways obstructed by precipitation) during the performance of the activity. As such, for instance, finding a given drop location (e.g., at a stop location such as a shopping mall) for a package being delivered by the fleet vehicle driver may be time consuming when the driver is not familiar with the location. As such, the route taken or obstacles encountered may lead to increased time spent at the stop location, thereby adversely impacting the overall schedule of the fleet vehicle driver.

As such, it would be beneficial from an analytics and efficiency determination standpoint to track one or more metrics at the stop location to give more insight to the reason for an unexpected increase in stop time. For example, measuring the time a fleet vehicle driver spends at a location is one of a number of metrics available for analysis. Further, for instance, a fleet vehicle driver may have encountered problems at a given stop leading to an unplanned or unforeseen increase in stop time, which may adversely impact the fleet vehicle driver's overall schedule for the day. As such, in some fleet management systems, and for the purpose of fleet routing and delivery, it is desirable to measure the fleet vehicle driver's performance, for example, at a given planned stop location.

Accordingly, the present aspects provide one or more solutions to determine inefficiencies in a fleet vehicle driver route, in particular, inefficiencies in driver activity at a stop location, and to improve efficiency in the route, and in particular in the driver activity at the stop location, for one or more fleet vehicles and/or drivers in a fleet management system. The present aspects allow for granular tracking of an individual fleet vehicle driver and efficiency determinations specific to both the fleet vehicle driver and to the fleet as a whole. For instance, an activity level of a fleet vehicle driver, or more specifically, a number of steps, may be obtained at a stop location and used to perform or execute one or more analytics functions. In some aspects, the analytics functions may provide or determine one or more driver-specific stop location metrics based on, for example, an activity level such as a number of steps of the fleet vehicle driver. Additionally, the one or more fleet vehicle stop determinations may assist with forming or adjusting a profile of the fleet vehicle driver, where the profile may be used to increase the overall route and work efficiency of the fleet vehicle driver, thereby resulting in routes having improved efficiency for each driver in the fleet management system.

Various aspects will now be described with reference to the drawings. In the following description, for purposes of explanation, numerous specific details are set forth in order to provide a thorough understanding of one or more aspects. It should be understood, however, that such aspect(s) may be practiced without these specific details.

Referring now to FIG. 1, in an aspect, a communication system 100 includes one or more components and/or modules for improving efficiency in a fleet vehicle route, and in particular, for improving efficiency in one or more activities performed by a vehicle driver at one or more stop locations on the vehicle route. As used herein, the term "component" and/or "module" may one of the parts that make up a device, may be hardware or software or firmware, and may be divided into other modules and/or distributed across one or more processors.

In an aspect, communication system 100 may include one or more communication devices 144a and 144b, which may be configured to communicate with one or more devices, such as communication device 146 (e.g., a smartphone, tablet computer, etc.), which may include analytics functions component 120, communication component 415, processor 405, and/or memory 410. In some aspects, communication device 146 may be an extended productivity device, such as a cell phone or tablet type device, which may be carried by the vehicle driver 150 and which communicates with and may be used in conjunction with communication device 144a located in or part of the vehicle 104a. In some aspects, some or all of the functionalities may be maintained or integrated within a single device, for example, one of communication device 144a or communication device 146.

Further, communication system 100 may include network operations system 112 configured to communicate with one or more vehicles 104a and 104b via communication devices 144a and 144b, which may be located on each vehicle 104a and 104b, or associated with each driver of each vehicle 104a and 104b. For example, network operations system 112 may be one or more computer devices on a network that include one or more software applications that may execute one or more hardware devices. In some aspects, network operations system 112 may be located remotely from communication device 144a and communication device 146. In some aspects, communication devices 144a and 144b may each be a device that can communicate directly or indirectly with the network operations system 112. Further, in some aspects, communication devices 144a and 144b may be a mobile computing platforms (MCP). In an aspect, communication device 144a and communication device 144b may be coupled to a respective vehicle, such as, but not limited to vehicle 104a and vehicle 104b. It should be noted that, in some aspects, communication device 146 may be configured to communicate with network operations system 112, e.g., via one or more communication channels, without going through communication device 144a.

The communication system 100 may include one or more fleets of vehicles 104a and 104b, each fleet having at least one vehicle. In some aspects, a fleet may include tens, hundreds or thousands of vehicles. An example fleet is illustrated as having two vehicles, e.g., vehicle 104a and vehicle 104b. Additional fleets (not shown) are contemplated, but not shown. In implementations, each communication devices 144a and 144b may be configured to collect and transmit data associated with the operation of each respective vehicle 104a and 104b to the network operations system 112.

In an aspect, communication devices 144a and 144b, and its corresponding components and/or modules may be implemented as a software application defined by code or instructions stored in a computer-readable medium and executed by a processor, and/or as hardware (e.g., a specially programmed processor module), and/or as firmware. According to the present aspects, one of the components of communication device 144a (or, similarly, communication device 144b) may include analytics functions component 120 which may be configured to perform one or more fleet vehicle stop determinations and improve an efficiency of fleet vehicle routes. Aspects of analytics functions component 120 are further described herein with respect to network operations system 112 including data center 114.

In some aspects, communication device 144a may also include a processor 405 configured to execute computer-readable code and/or instructions, and/or a memory 410 configured to store computer-readable code, where the processor 405 and/or memory 410 may define all or part of the analytics functions component 120 and also may store data associated with the components and/or communication device 144a. Communication device 144a may also include a user interface or display, a mobile application server, and a communications module (e.g., including the one or more transceivers, and one or more of terrestrial and Wi-Fi modems, one or more antennae, a GPS module, and a satellite communications module). For example, in an aspect, communication device 144a may include, but is not limited to, one or more of an MCP200 platform, a Roadnet platform, the XRS platform, and the intelligent vehicle gateway (IVG) device, each of which is sold by OMNITRACS LLC of Dallas, Tex.

As an example only, each vehicle 104 may be in bi-directional communication with network operations system 112 over at least one communication channel. In the example shown in FIG. 1, each vehicle 104 is in bi-directional communication with the network operations system 112 over a communication channel such as at least one or any combination of a satellite-based communication system 108 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, Wi-Fi, Bluetooth, or, when the vehicle is stopped, via a wired connection 113 through the Internet). Depending on many factors, data may be exchanged with the vehicles 104 using one or both of the satellite communication system 108 and the terrestrial-based communication system 110.

In an aspect, many different types of data are collected and transferred from the vehicles 104 to the network operations system 112. Examples of such data include, but are not limited to, vehicle performance data, driver performance data, critical events, messaging and position data, location delivery data, and many other types of data. All of the information that is communicated to and from the vehicles 104 may be processed via the network operations system 112. The network operations system 112 can be considered as a data clearinghouse that receives all data that is transmitted to and received from the vehicles 104. Moreover, in an aspect, network operations system 112 may include one or more back-end servers. Thus, in some aspects, the collected information may periodically (e.g., every x minutes, where x is a whole number, or once a day, or upon availability of a wired or wireless connection) be transmitted from the communication device 144a to the network operations system 112 for analysis and record keeping.

The communication system 100 also includes a data center 114, which may be part of or in communication with network operations system 112. The data center 114 illustrates one possible implementation of a central repository for all of the data received from each of the vehicles 104. As an example, as mentioned above many different types of data are transmitted from the vehicles 104 to the network operations system 112. In the case where data center 114 is in communication with network operations system 112, the data may be transmitted via connection 211 to the data center 114. The connection 111 may comprise any wired or wireless dedicated connection, a broadband connection, or any other communication channel configured to transport the data. Moreover, in an aspect, data center 114 may include one or more back-end servers analyzing the one or more parameters transmitted from the one or more communication device(s) 144a. Additionally or alternatively, data may also be exchanged between the plurality of communication device(s) 144a and/or communication device 146 using, for example, peer-to-peer (P2P) communication without the involvement of the network operations system 112.

In some aspects, data center 114 may include analytics functions component 120, which may be configured to receive one or more indications of a number of steps 154 of fleet vehicle driver 150 corresponding to one or more activities performed at one or more stop locations along a route, and to determine one or more driver-specific stop location metrics based on performing one or more analytics functions using, for example, a number of steps of a fleet vehicle driver. Such aspects may identify fleet vehicle driver inefficiencies and optimize one or more routes, including vehicle driver activity at a stop location, to overcome such inefficiencies.

For example, fleet vehicle driver 150 may possess or may carry communication device 146, which may determine (e.g., track) a number of steps 154 of the fleet vehicle driver. In some aspects, communication device 146 (e.g., a smartphone, tablet computer, etc.) may include a step tracking device, such as one or more of a pedometer, an accelerometer, a gyroscope, or a compass to determine or detect a number of steps 154 of fleet vehicle driver at a given stop location, e.g., associated with performing an activity at the stop location.

In a non-limiting use case, for instance, fleet vehicle driver 150, who may be associated with, or otherwise operating fleet vehicle 104a, may stop at a particular point along or at the end of a route (e.g., package delivery or pickup route), such point referred to herein as a stop location. Upon detecting that fleet vehicle driver 150 has exited fleet vehicle 104a with communication device 146 at a stop location, communication device 146 may determine the number of steps 154 fleet vehicle driver 150 takes between exiting fleet vehicle 104a and returning to fleet vehicle 104a. That is, communication device 146 may track the number of steps 154 that fleet vehicle driver 150 takes at one or more given stop locations, where each stop location may be known to correspond to one or more activities to be performed by fleet vehicle driver 150 at the stop location. As such, in some aspects, analytics functions component 120 may be configured to receive (e.g., via communication device 146, and/or communication device 144a and/or one or more network components/entities) a first indication of a number of steps 154 of fleet vehicle driver 150 at a fleet vehicle stop location.

Upon receiving the number of step 154, analytics functions component 120 may be configured to determine one or more driver-specific stop location metrics 162 using at least the number of steps 154 of the fleet vehicle driver 150. In some aspects, the one or more driver-specific stop location metrics 162 may include a target number of steps, driver efficiency, or a number of driver stops. For example, in some aspects, analytics functions component 120 may determine or otherwise establish a target number of steps that may be needed to complete one or more activities at a stop location (e.g., a task at the stop location). Specifically, analytics functions component 120 may be configured to determine a target number of steps associated with the fleet vehicle stop location based on one or more analytics functions such as an analytic function that compare the number of steps 154 of the fleet vehicle driver 150 to the target number of steps and/or to a number of steps of another fleet vehicle driver different from the fleet vehicle driver (e.g., associated with a different fleet vehicle 104b). As such, such a comparison and/or establishing a target number of steps may provide a baseline for determining whether a particular fleet vehicle driver is performing a task or an activity at an associated stop location inefficiently or poorly.

For instance, in another example of an analytics function that determines driver-specific stop location metrics 162, using the target number of steps associated with an activity at a given stop location, analytics functions component 120 may determine whether the fleet vehicle driver 150 is efficient at performing the activity at the given stop location. Specifically, analytics functions component 120 may be configured to determine that the number of steps 154 of the fleet vehicle driver 150 does not satisfy (e.g., exceeds) the target number of steps associated with the fleet vehicle stop location. Further, analytics functions component 120 may be configured to send an alert indication (e.g., alert message) to one or both of a communication device (e.g., communication device 144a) of the fleet vehicle 104a or an electronic device (e.g., communication device 146) of the fleet vehicle driver 150 based on determining that the number of steps 154 of the fleet vehicle driver does not satisfy the target number of steps. That is, analytics functions component 120 may alert the fleet vehicle driver 150 of an inefficient stop at a stop location or an inefficient activity at a stop location (e.g., an inefficiency in performance of a task).

Further, analytics functions component 120 may be configured to calculate or otherwise determine fleet vehicle driver stop location efficiency based on the number of steps 154 divided by the target number of steps at the stop location (or for a given activity at the stop location), and/or a number of steps 154 divided by the time duration spent by the fleet vehicle driver 150 at the stop location (or for performing the activity at the stop location). Specifically, for example, to determine whether the number of steps 154 of the fleet vehicle driver 150 does not satisfy the target number of steps, analytics functions component 120 may be configured to divide the number of steps 154 of the fleet vehicle driver 150 by the target number of steps associated with the fleet vehicle stop location (or the activity at the stop location), and/or dividing the number of steps 154 of the fleet vehicle driver 150 by a stop time duration of the fleet vehicle driver 150 associated with the fleet vehicle stop location (or with the activity at the stop location). In some aspects, the fleet vehicle stop location corresponds to or includes to one or both of a package delivery location or a package pickup location In further aspects, another example of the one or more fleet vehicle stop determinations may include analytics functions component 120 determining the overall efficiency of the fleet vehicle driver compared to other fleet vehicle drivers in the fleet. In particular, analytics functions component 120 may calculate or determine overall delivery efficiency of the fleet vehicle driver 150 as a total number of steps of the fleet vehicle driver 150 divided by the target numbers of steps, for all stop locations along the route, e.g., all locations on the route where the fleet vehicle driver 150 has stopped and a corresponding number of steps has been tracked and recorded.

For example, in this example of the one or more fleet vehicle stop determination, analytics functions component 120 may be configured to receive an indication of an additional number of steps 160 of the fleet vehicle driver 150 at the fleet vehicle stop location or a different fleet vehicle stop location (e.g., number of steps associated with another stop location). For example, the additional number of steps 160 may be different or distinct from the number of steps 154 with respect to or based on a time of occurrence, a stop location. As such, in an example, the number of steps 154 may occur at a first date, time, and/or location and the additional number of steps 160 may occur at a second date, time, and/or location. Some or all of the second date, time, and/or location may be different from the first date, time, and/or location. Analytics functions component 120 may then be configured to aggregate the number of steps 154 and the additional number of steps of the fleet vehicle driver 150 to obtain an aggregated number of steps. Further, analytics functions component 120 may be configured to determine the overall efficiency of the fleet vehicle driver 150 by dividing the aggregated number of steps by a target aggregated number of steps, where the operation provides an overall efficiency associated with or for the fleet vehicle stop location or the different fleet vehicle stop location.

Additionally, in another example of the one or more fleet vehicle stop determinations, analytics functions component 120 may determine a difficulty of a stop location and/or activity at a stop location, relative to other stop locations and/or other activities at other stop locations, relative to an individual fleet driver 150, and/or relative to one vehicle driver to another based on tracking the information described herein for other fleet vehicle drivers. For example, one or more fleet vehicle drivers including fleet vehicle driver 150 may report or send the number of steps 154 associated with or corresponding to a specific stop location and/or activity at the stop location. In some instances, analytics functions component 120 may average the aggregated number of steps provided by each fleet vehicle driver at the specific stop location and/or activity at the stop location. The average number of steps may then be compared to an acceptable threshold limit (e.g., of a number of steps—which may correspond to a target number or a fewest number of steps expected to complete a task or activity at a stop location) to determine whether the fleet vehicle drivers are exerting more time and energy at the specific stop location or on a particular activity at the stop location.

Additionally, in another example, the one or more fleet vehicle stop determinations may include determining a number of person stops, within a vehicle stop. In some aspects, a person stop may be a stop associated with a particular date, time, and/or location where an unscheduled route interruption is detected and/or initiated by the fleet vehicle driver 150. A vehicle stop may be a scheduled stop on a particular route (e.g., for delivery or pickup of packages). For example, analytics functions component 120 may to determine how many times the fleet vehicle driver 150 stopped throughout the course of a time period (e.g., workday).

For example, with regard to a person stop, communication device 146 may utilize one or more integrated devices such as, but not limited to, a pedometer to determine whether the driver stopped in one place long enough to constitute a person stop. For instance, in one example, by counting the time between steps, and when the time exceeds a certain threshold, then vehicle stop determination component 120 may detect a person stop.

Further, in an example of detecting a number of person stops, analytics functions component 120 may be configured to determine a first time duration between a first step and a second step from the number of steps 154 (e.g., time between steps) or a second time duration corresponding to a last step (e.g., time since last step). Analytics functions component 120 may then be configured to determine that the first time duration or the second time duration satisfies (e.g., meets or exceeds) a vehicle stop time threshold. As such, analytics functions component 120 may be configured to detect a fleet vehicle driver 150 stop, and in particular, a person stop, based on determining that the first time duration or the second time duration satisfies the stop threshold.

Further, in another example, the one or more fleet vehicle stop determinations may include determining whether the driver has made an excessive amount of stops at a given vehicle stop or location. Such a determination may indicate that the fleet vehicle driver 150 is taking a break or mingling with customers or performing any other unplanned activity. Specifically, analytics functions component 120 may be configured to determine that the number of steps 154 of the fleet vehicle driver 150 satisfies (e.g., meets or exceeds) an inefficient threshold. Additionally, analytics functions component 120 may be configured to generate an inefficiency alert representing an inefficient fleet vehicle driver based on determining that the number of steps 154 of the fleet vehicle driver 150 satisfies the inefficient threshold.

Additionally, in another example of the one or more fleet vehicle stop determinations, analytics functions component 120 may report on the cumulative or aggregated time of the person stops of the fleet vehicle driver 150 within a fleet vehicle stop to determine whether the flee vehicle driver 150 is or is not in substantially continuous motion during a vehicle stop or if the fleet vehicle driver 150 may be taking an unauthorized break.

For example, analytics functions component 120 may be configured to receive, as part of the number of steps 154, an associated or corresponding time duration from a first step to a last step from the number of steps 154. Further, one or more additional steps and/or time durations may be received as part of or associated with the same fleet vehicle stop. As such, analytics functions component 120 may aggregate the total time duration and the number of steps 154 for a given stop location to obtain an aggregated time duration and an aggregated number of steps for that given stop location. To determine inefficiencies, analytics functions component 120 may be configured to compare one or both of the aggregated number of steps or the aggregated time duration to a corresponding threshold (e.g., total step threshold and/or time threshold—which may respectively correspond to the fewest number of step or shortest amount of time expected to complete the task at the stop). In the event the aggregated number of steps and/or the aggregated time duration meet or exceed each corresponding threshold, the vehicle driver may be identified as inefficient.

In some aspects, analytics functions component 120 may report on the above aggregation determinations to determine the overall performance of the fleet vehicle driver 150, which may be compared to other drivers in the fleet. For example, analytics functions component 120 may compare the aggregated values to an aggregated driver threshold— and if met or exceeded, the fleet vehicle driver is determined to be inefficient. In some aspects, in executing the analytics functions, analytics functions component 120 may determine that the number of steps of the fleet vehicle driver satisfy a one or more tasks from a set of tasks associated with the fleet vehicle stop location.

Further, in some aspects, analytics functions component 120 may determine a relative difficulty of a stop, and/or perform reporting/determinations on steps and person stops by vehicle stop to determine the relative difficulty of a stop. For example, to determine a stop difficulty, analytics functions component 120 may compare or correlate the number of steps 154 or average number of steps of fleet vehicle driver 150 to other drivers in order to determine whether a particular stop is more difficult. In the event the number of steps 154 or average number of steps (e.g., at the same stop location) of the fleet vehicle driver 150 exceeds one or both of a difficulty threshold or the average number of steps of different fleet vehicle drivers, then a determination may be made that the stop is of a difficult level for the fleet vehicle driver 150.

Moreover, analytics functions component 120 may establish or determine a driver workday (e.g., tasks) for one or more vehicle drivers to account for the fleet vehicle driver's history and/or the relative difficulty (e.g., compared to other fleet vehicle drivers) of a series of stops. In some aspects, the driver workday may be an accounting of the set of activities or tasks along the one or more routes driven by the vehicle driver, and which may include one or more difficulty metrics associated with each task. For example, analytics functions component 120 may be configured to retrieve a fleet vehicle driver profile of a fleet vehicle driver 150 from a profile database 156. In some aspects, the profile database may include one or more of a history of fleet vehicle stop locations, or a number of steps 154 of the fleet vehicle driver at one or more respective fleet vehicle stop locations (e.g., a record of a number of steps at each and every given stop location), or the driver workday including routes and corresponding tasks such as activities, which may each activity corresponds to a difficulty metric.

The fleet vehicle profile of fleet vehicle driver 150 may also include demographic information of the fleet vehicle driver 150, such as, but not limited to age, height, weight, and/or history of injuries. As such, the fleet vehicle profile may enable analytics functions component 120 to determine one or more efficient routes for the respective vehicle driver 150 during a workday by taking into account the various information stored in the respective profile. In some aspects, an efficient route may be the route corresponding to or representing the shortest amount of distance traveled and time spent at or for a particular stop location by a fleet vehicle driver. For instance, analytics functions component 120 may, based on the fleet vehicle driver profile, determine or schedule stop locations based on driver demographics to match the fleet vehicle driver 150 with an appropriate level of stop difficulties.

For example, an efficient route may be determined based on a difficulty level corresponding to a route. Specifically, an initial difficulty level may be determined for a particular route. Subsequently, the initial difficulty level may be adjusted (e.g., recalculate) based on driver profile information to arrive at a driver-specific level of difficulty. Further, analytics functions component 120 may schedule a fleet vehicle driver to travel to stops where the driver-specific level of difficulty meets or is less than the general level of difficulty. In other words, the fleet vehicle driver may experience less difficulty than the average driver, so the fleet vehicle driver would be more efficient.

In some aspects of determining one or more routes, analytics functions component 120 may determine one or more fleet vehicle stop locations based on the driver demographic information to match the fleet vehicle driver with a corresponding stop difficulty level. Further, analytics functions component 120 may assign one or more fleet vehicle stop locations categorized at a highest difficulty level at one of a beginning of a route schedule or an end of the route schedule based on a fleet vehicle driver preference within the fleet vehicle driver profile. Additionally, analytics functions component 120 may plan or determine stops such that the relative amount of work at a combined list of stops is normalized across a group of fleet vehicle drivers to ensure that one fleet vehicle driver does not get assigned with most or all of the most difficult stops.

Further, analytics functions component 120 may compare first and second fleet vehicle drivers to provide efficient route scheduling. Specifically, analytics functions component 120 may retrieve a fleet vehicle driver profile of a different fleet vehicle driver from the profile database 156. Further, analytics functions component 120 may correlate the fleet vehicle driver profile of the fleet vehicle driver 150 with the fleet vehicle driver profile of the different fleet vehicle driver. Additionally, analytics functions component 120 may assign (e.g., schedule0 one of the fleet vehicle driver 150 or the different fleet vehicle driver to one or more routes based on the correlation.

An example of determining an efficient route may involve determining a route efficiency metric for a proposed route. For instance, as noted above, a difficulty level for a given stop may be determined, for instance, based on an average of an aggregated number of steps of one or more fleet vehicle drivers and/or an aggregated time duration at a given stop compared to one or more a defined difficulty thresholds (e.g., tiered thresholds corresponding to various difficulty levels). Where the aggregated values meet or exceed one or more defined difficulty thresholds, the route and/or stop is associated with a respective difficulty tier.

As such, analytics functions component 120 may be configured to determine one or more routes including one or more fleet vehicle stop locations for the fleet vehicle driver 150 based on the fleet vehicle driver profile (e.g., stored at profile database 156). In addition, analytics functions component 120 may be configured to provide the one or more routes including one or more fleet vehicle stop locations to a mobile computing platform (e.g., communication device 144a) of a fleet vehicle 104a of the fleet vehicle driver 150 and/or to communication device 146.

In some aspects, analytics functions component 120 may determine stop locations for fleet vehicle drivers such that the most difficult stops are either at the beginning or end of the day based on driver preference. Further, in some aspects, analytics functions component 120 may determine stop locations such that the amount of work (e.g., as identified by the length of time spent at a stop location by a given fleet vehicle driver relative to the other fleet vehicle drivers or to an average stop duration) at a combined list of stops is normalized across a group of fleet vehicle drivers to ensure that one fleet vehicle driver is not assigned with most and/or all of the most difficult stops. Additionally, in some aspects, analytics functions component 120 may provide for real-time monitoring of the activity of fleet vehicle driver 150, such that the number of steps 154 at any given time or stop location may be communicated to analytics functions component 120 in real-time for performance of one or more fleet vehicle stop determinations. For example, analytics functions component 120 may, upon determining that the stop location is taking longer than expected (e.g., number of steps 154 meets and/or exceeds a target number threshold and/or the time duration of stop meets or exceeds a threshold), may send an alert to the communication device 146 of fleet vehicle driver 150 indicating such delay.

In an aspect, for example, data center 114 may include any number of application servers and data stores 115, where each may be associated with a separate fleet and/or driver management or performance data. In an aspect, each application server and data store may include a processor, memory including volatile and non-volatile memory, specially-programmed operational software, a communication bus, an input/output mechanism, and other operational systems.

For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers In some aspects, communication device 146 may include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), a global positioning system device, an accelerometer, a pedometer, a compass, or any other suitable device that is configured to communicate via a wireless medium.

Figure 2:
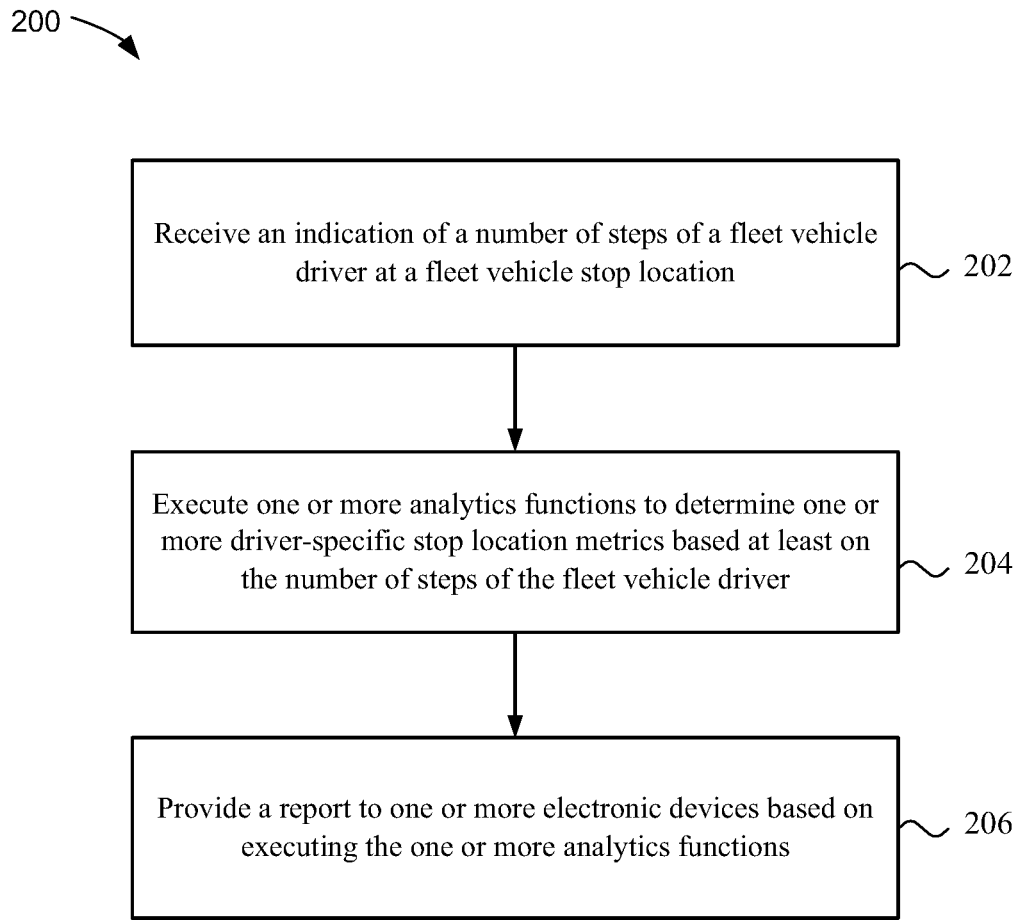
FIGS. 2 and 3 are flowcharts of an aspect of a method of fleet vehicle route optimization in accordance with some aspects of the present disclosure.
Figure 3:
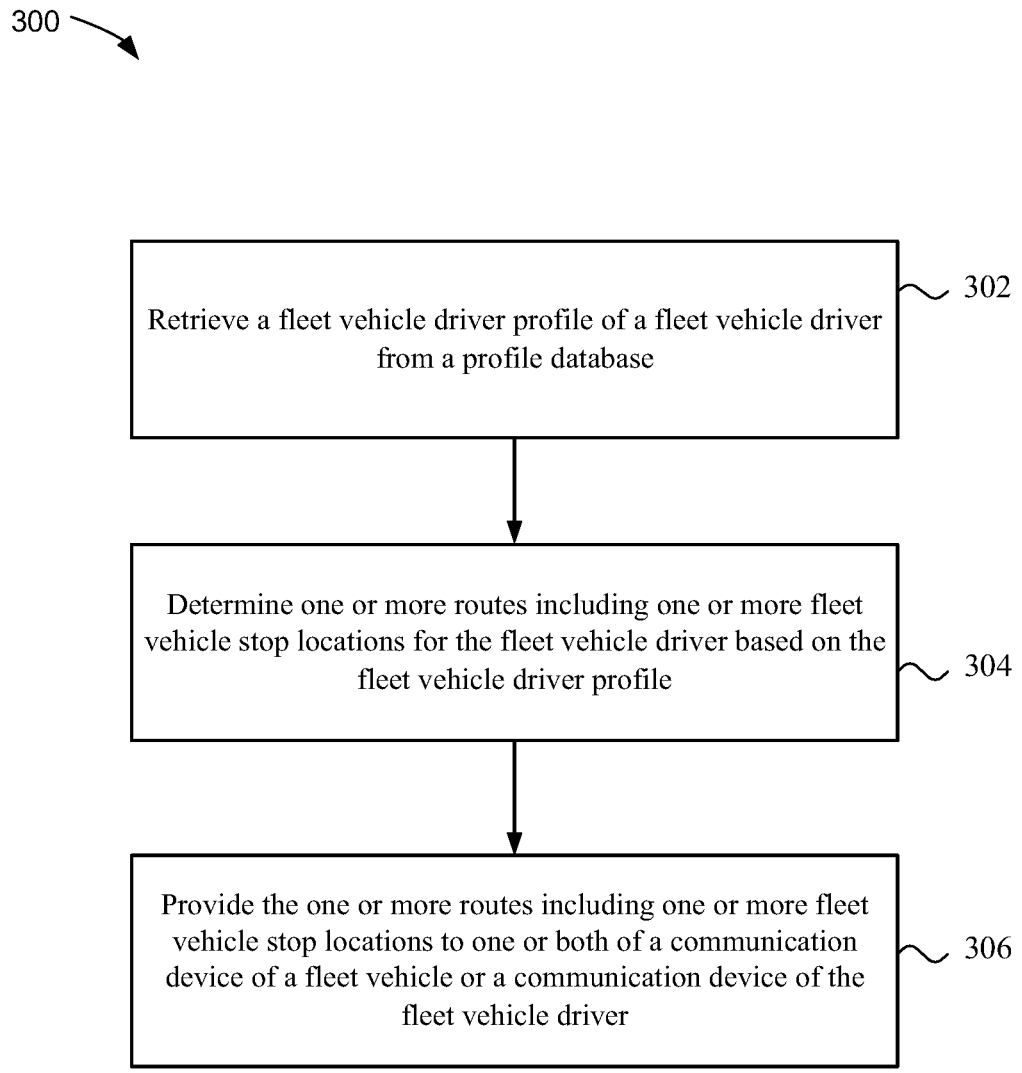

FIGS. 2 and 3 are flow diagrams of method 200 for fleet vehicle route optimization within, for example, a fleet vehicle in accordance with some aspects of the present disclosure. In some aspects, method 200 may be performed at one or both of communication device 144a (FIG. 1) or network operations system 112 including data center 114

(FIG. 1). Some operations in method 200 may be combined, the order of some operations may be changed, and some operations may be omitted.

Referring to FIG. 2, at block 202, method 200 may receive an indication of a number of steps of a fleet vehicle driver at a fleet vehicle stop location. For example, communication device 144a (FIG. 1) and/or network operations system 112 including data center 114 (FIG. 1) may execute one or more components and/or modules (e.g., analytics functions component, FIG. 1) to receive, via a wireless connection from communication device 146 (FIG. 1), an indication of a number of steps 154 (FIG. 1) of a fleet vehicle driver 150 (FIG. 1) at a fleet vehicle stop location.

Further, at block 204, method 200 may execute one or more analytics functions to determine one or more driver-specific stop location metrics based at least on the number of steps of the fleet vehicle driver. For example, communication device 144a (FIG. 1) and/or network operations system 112 including data center 114 (FIG. 1) may execute one or more components and/or modules (e.g., analytics functions component, FIG. 1) to execute one or more analytics functions to determine one or more driver-specific stop location metrics 162 (FIG. 1) based at least on the number of steps 154 (FIG. 1) of the fleet vehicle driver 150 (FIG. 1).

At block 206, method 200 may provide a report to one or more electronic devices based on executing the one or more analytics functions. For instance, communication device 144a (FIG. 1) and/or network operations system 112 including data center 114 (FIG. 1) may execute one or more components and/or modules (e.g., analytics functions component, FIG. 1) to provide, via a wired or wireless connection, a report to one or more electronic devices based on executing the one or more analytics functions.

Referring to FIG. 3, at block 302, method 300 may retrieve a fleet vehicle driver profile of a fleet vehicle driver from a profile database. For example, communication device 144a (FIG. 1) and/or network operations system 112 including data center 114 (FIG. 1) may execute one or more components and/or modules (e.g., analytics functions component, FIG. 1) to retrieve a fleet vehicle driver profile of a fleet vehicle driver from a profile database (e.g., profile database 156, FIG. 1). In some aspects, the profile includes one or both of a history of fleet vehicle stop locations or a number of steps of the fleet vehicle driver at one or more respective fleet vehicle stop locations.

Further, at block 304, method 300 may determine one or more routes including one or more fleet vehicle stop locations for the fleet vehicle driver based on the fleet vehicle driver profile. For instance, communication device 144a (FIG. 1) and/or network operations system 112 including data center 114 (FIG. 1) may execute one or more components and/or modules (e.g., analytics functions component, FIG. 1) to determine one or more routes including one or more fleet vehicle stop locations for the fleet vehicle driver 150 (FIG. 1) based on the fleet vehicle driver profile (e.g., from profile database 156, FIG. 1).

At block 306, method 300 may provide the one or more routes including one or more fleet vehicle stop locations to one or both of a communication device of a fleet vehicle or a communication device of the fleet vehicle driver. For example, communication device 144a (FIG. 1) and/or network operations system 112 including data center 114 (FIG. 1) may execute one or more components and/or modules (e.g., analytics functions component, FIG. 1) to provide the one or more routes including one or more fleet vehicle stop locations to one or both of a communication device (e.g., communication device 144a, FIG. 1) of a fleet vehicle 104a (FIG. 1), from network operations system 112 (FIG. 1), or communication device 146 (FIG. 1) of the fleet vehicle driver 150 (FIG. 1) from communication device 144a (FIG. 1).

Figure 4:
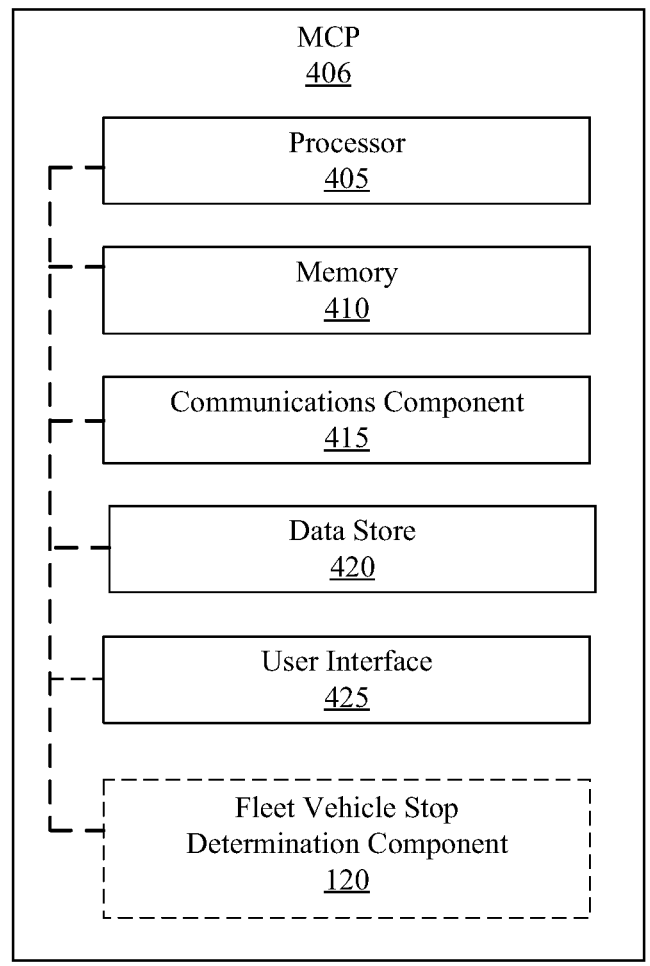
FIG. 4 is a block diagram of an example of an aspect of a communication device in accordance with some aspects of the present disclosure.

Referring to FIG. 4, in an example that should not be construed as limiting, communication device 406 may include additional components that operate in conjunction with analytics functions component 120, which may be implemented in specially programmed computer readable instructions or code, firmware, hardware, or some combination thereof. In some aspects, communication devices 144a and 144b (FIG. 1), as well as communication device 146 (FIG. 1) may include at least a portion or all of the components and/or subcomponents of communication device 406.

In an aspect, features described herein with respect to the functions of analytics functions component 120 may be implemented in or executed using one or any combination of processor 405, memory 410, communications module 415, and data store 420. For example, determination component 109 may be defined or otherwise programmed as one or more processor modules of processor 805. Further, for example, analytics functions component 120 may be defined as a computer-readable medium (e.g., a non-transitory computer-readable medium) stored in memory 410 and/or data store 420 and executed by processor 405.

Moreover, for example, inputs and outputs relating to operations of analytics functions component 120 may be provided or supported by communications module 415, which may provide a bus between the modules of computer device or an interface for communication with external devices or modules. Processor 405 can include a single or multiple set of processors or multi-core processors. Moreover, processor 405 can be implemented as an integrated processing system and/or a distributed processing system.

Memory 410 may operate to allow storing and retrieval of data used herein and/or local versions of applications and/or software and/or instructions or code being executed by processor 405, such as to perform the respective functions of analytics functions component 120 as described herein. Memory 410 can include any type of memory usable by a computer, such as random access memory (RAM), read only memory (ROM), tapes, magnetic discs, optical discs, volatile memory, non-volatile memory, and any combination thereof.

Communications module 415 is operable to establish and maintain communications with one or more internal components/modules or external devices utilizing hardware, software, and services as described herein. Communications component 415 may carry communications between modules on MCP 406 including analytics functions component 120, as well as between user and external devices, such as devices located across a communications network and/or devices serially or locally connected to communication device 406. For example, communications component 415 may include one or more buses, and may further include transmit chain modules and receive chain modules associated with a transmitter and receiver, respectively, or a transceiver, operable for interfacing with external devices.

Additionally, data store 420, which can be any suitable combination of hardware and/or software, which provides for mass storage of information, databases, and programs employed in connection with aspects described herein. For example, data store 420 may be a data repository for applications not currently being executed by processor 405.

Communication device 406 may additionally include a user interface module 425 operable to receive inputs from a user, and further operable to generate outputs for presentation to the user. User interface module 425 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 425 may include one or more output devices, including but not limited to a display, a speaker, a haptic feedback mechanism, a printer, any other mechanism capable of presenting an output to a user, or any combination thereof.

Figure 5:
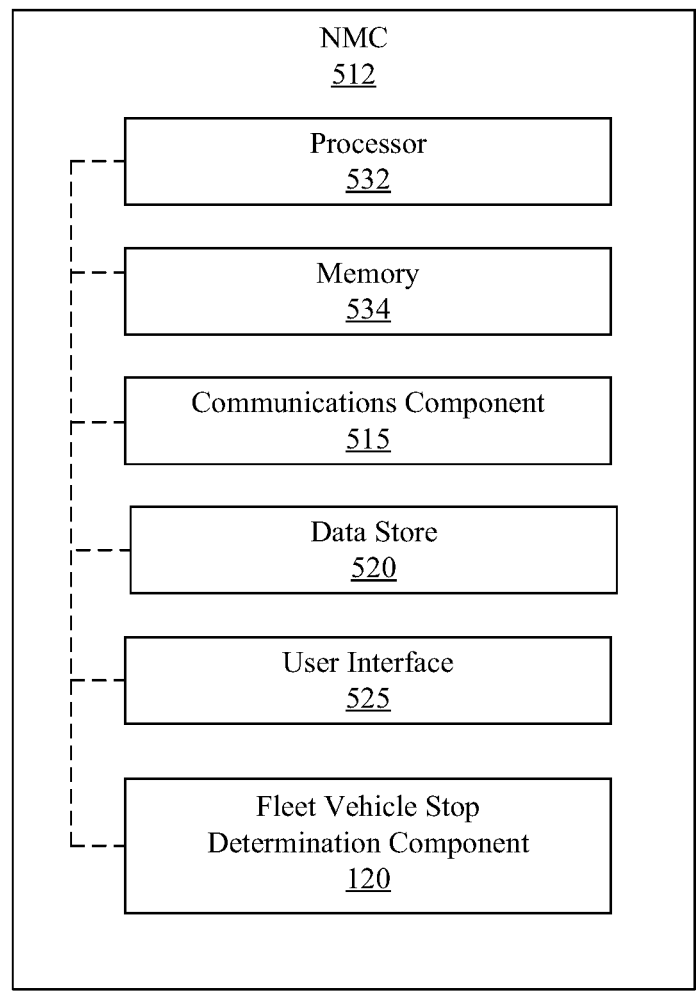
FIG. 5 is a block diagram of an example of an aspect of a communication device in accordance with some aspects of the present disclosure.

Referring to FIG. 5, in an example that should not be construed as limiting, network operations system 512 may include additional components for implementing secure communication via analytics functions component 120, which may be implemented in specially programmed computer readable instructions or code, firmware, hardware, or some combination thereof. In some aspects, network operations system 112 (FIG. 1) may include at least a portion or all of the components and/or subcomponents of network operations system 512.

In an aspect, the features of analytics functions component 120 described herein may be implemented in or executed using one or any combination of processor 532, memory 534, and data store 520. For example, analytics functions component 120 may be defined or otherwise programmed as one or more processor modules of processor 532. Further, for example, analytics functions component 120 may be defined as a computer-readable medium (e.g., a non-transitory computer-readable medium) stored in memory 534 and/or data store 520 and executed by processor 532. Moreover, for example, inputs and outputs relating to operations of analytics functions component 120, which may provide a bus between the components/modules of network operations system 512 or an interface for communication with external devices or components/modules.

Processor 532 can include a single or multiple set of processors or multi-core processors. Moreover, processor 532 can be implemented as an integrated processing system and/or a distributed processing system.

Memory 534 may be operable for storing and retrieving data used herein and/or local versions of applications and/or software and/or instructions or code being executed by processor 532, such as to perform the respective functions of the respective entities described herein. Memory 534 can include any type of memory usable by a computer, such as random access memory (RAM), read only memory (ROM), tapes, magnetic discs, optical discs, volatile memory, non-volatile memory, and any combination thereof.

Analytics functions component 120 may be operable to establish and maintain communications with one or more internal components/modules and/or external devices utilizing hardware, software, and services as described herein. Communications component 515 may carry communications between modules on network operations system 512, as well as between user and external devices, such as devices located across a communications network and/or devices serially or locally connected to NMC 512. For example, analytics functions component 120 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 532.

Network operations system 512 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 3-5 which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus, comprising:
a processor; and
a memory coupled to the processor, wherein the memory includes instructions executable by the processor to:
retrieve a plurality of fleet vehicle driver profiles of a plurality of fleet vehicle drivers from a profile database, wherein each profile includes a history of fleet vehicle stop locations and a number of steps, measured by a pedometer, of each fleet vehicle driver needed to complete one or more activities at one or more respective fleet vehicle stop locations;
determine one or more routes including one or more of the fleet vehicle stop locations for each fleet vehicle driver based on each fleet vehicle driver profile, including:
determine a first work efficiency metric associated with an initial difficulty level of the one or more routes based on an average of an aggregated number of steps for each fleet vehicle driver at the one or more of the fleet vehicle stop locations of the one or more routes compared to a difficulty threshold;
determine a second work efficiency metric by adjusting the initial difficulty level based on each driver profile information to arrive at a driver-specific level of difficulty for the one or more routes; and
determine stops such that a relative amount of work based on the second work efficiency metric at a combined list of stops is normalized across the plurality of fleet vehicle drivers; and
wirelessly transmitting the one or more routes including one or more of the fleet vehicle stop locations to one or both of a communication device of a fleet vehicle or a communication device of each respective fleet vehicle driver.

2. The apparatus of claim 1, wherein the memory includes instructions executable by the processor to:
receive an indication of the number of steps of a fleet vehicle driver to complete the task at the one or more respective fleet vehicle stop locations;
execute one or more analytics functions to determine one or more driver-specific stop location metrics associated with the driver-specific level of difficulty based at least on the number of steps of the fleet vehicle driver, including:
determining a first time duration between a first step and a second step from the number of steps or a second time duration corresponding to a time since a last step of the number of steps;
determining that the first time duration or the second time duration satisfies a vehicle stop time threshold; and
detecting a person stop metric based on determining that the first time duration or the second time duration satisfies the vehicle stop time threshold.

3. The apparatus of claim 2, wherein executing the one or more analytics functions includes determining a target number of steps associated with a fleet vehicle stop location based on one or both of the number of steps of the fleet vehicle driver or a number of steps of another fleet vehicle driver different from the fleet vehicle driver.

4. The apparatus of claim 3, wherein the memory includes instructions executable by the processor to:
determine that the number of steps of the fleet vehicle driver exceeds the target number of steps associated with the fleet vehicle stop location.

5. The apparatus of claim 4, wherein determining that the number of steps of the fleet vehicle driver exceeds the target number of steps associated with the fleet vehicle stop location includes one or both of:
comparing the actual number of steps of the fleet vehicle driver to the target number of steps associated with the fleet vehicle stop location; or
comparing the number of steps of the fleet vehicle driver by a stop time duration of the fleet vehicle driver associated with the fleet vehicle stop location.

6. The apparatus of claim 2, wherein executing the one or more analytics functions includes determining that the number of steps of the fleet vehicle driver satisfy a one or more tasks from a set of tasks associated with a fleet vehicle stop location.

7. The apparatus of claim 2, wherein the memory includes instructions executable by the processor to:
receive an indication of an additional number of steps of the fleet vehicle driver at a fleet vehicle stop location or a different fleet vehicle stop location; and
aggregate the number of steps and the additional number of steps of the fleet vehicle driver,
wherein executing one or more analytics functions includes dividing the aggregated number of steps by an aggregated target number of steps for one or both of the fleet vehicle stop location or the different fleet vehicle stop location.

8. The apparatus of claim 2, wherein executing one or more analytics functions includes:
determining that the number of steps of the fleet vehicle driver satisfies an inefficient stop threshold; and generating an inefficient alert representing an inefficient fleet vehicle driver based on determining that the number of steps of the fleet vehicle driver satisfies the inefficient stop threshold.

9. The apparatus of claim 2, wherein the indication of the number of steps is provided by one or more of a pedometer, an accelerometer, a gyroscope, or a compass.

10. The apparatus of claim 2, wherein a fleet vehicle stop location corresponds to one of a package delivery location or a package pickup location.

11. The apparatus of claim 2, wherein the memory includes instructions executable by the processor to:
retrieve a fleet vehicle driver profile of a different fleet vehicle driver from the profile database;
correlate the fleet vehicle driver profile of the fleet vehicle driver with the fleet vehicle driver profile of the different fleet vehicle driver; and
assign one of the fleet vehicle driver or the different fleet vehicle driver to one or more routes based on the correlation.

12. A method of fleet vehicle route optimization, comprising:
retrieving a plurality of fleet vehicle driver profiles of a plurality of fleet vehicle drivers from a profile database, wherein each profile includes a history of fleet vehicle stop locations and a number of steps of each fleet vehicle driver needed to complete a one or more activities at one or more respective fleet vehicle stop locations;
determining one or more routes including one or more of the fleet vehicle stop locations for each fleet vehicle driver based on each fleet vehicle driver profile, including:
determining an initial difficulty level of the one or more routes; and
determine a first work efficiency metric associated with an initial difficulty level of the one or more routes based on an average of an aggregated number of steps for each fleet vehicle driver at the one or more of the fleet vehicle stop locations of the one or more routes compared to a difficulty threshold; and
determine a second work efficiency metric by adjusting the initial difficulty level based on each driver profile information to arrive at a driver-specific level of difficulty for the one or more routes; and
determine stops such that a relative amount of work based on the second work efficiency metric at a combined list of stops is normalized across the plurality of fleet vehicle drivers; and
wirelessly transmitting the one or more routes including one of the one or more fleet vehicle stop locations to one or both of a communication device of a fleet vehicle or a communication device of each respective fleet vehicle driver.

13. The method of claim 12, wherein at least one profile includes driver demographic information of the fleet vehicle driver.

14. The method of claim 13, wherein determining the one or more routes including the one or more fleet vehicle stop locations includes one or more of:
determining one or more fleet vehicle stop locations based on the driver demographic information to match the fleet vehicle driver with a corresponding stop difficulty level; or assigning one or more fleet vehicle stop locations categorized at a highest difficulty level at one of a beginning of a route schedule or an end of the route schedule based on a fleet vehicle driver preference within the fleet vehicle driver profile.

15. A non-transitory computer readable medium for fleet vehicle route optimization, wherein the computer readable medium comprises:
code executable by a processor to retrieve a plurality of fleet vehicle driver profiles of a plurality of fleet vehicle drivers from a profile database, wherein each profile includes a history of fleet vehicle stop locations and a number of steps of each fleet vehicle driver to complete a task at one or more respective fleet vehicle stop locations;
code executable by a processor to determine one or more routes including one or more of the fleet vehicle stop locations for each fleet vehicle driver based on each fleet vehicle driver profile including:
determine an initial difficulty level of the one or more routes; and
determine a first work efficiency metric associated with an initial difficulty level of the one or more routes based on an average of an aggregated number of steps for each fleet vehicle driver at the one or more of the fleet vehicle stop locations of the one or more routes compared to a difficulty threshold; and
determine a second work efficiency metric by adjusting the initial difficulty level based on each driver profile information to arrive at a driver-specific level of difficulty for the one or more routes; and
determine stops such that a relative amount of work based on the second work efficiency metric at a combined list of stops is normalized across the plurality of fleet vehicle drivers; and
code executable by a processor to wirelessly transmit the one or more routes including one or more of the fleet vehicle stop locations to one or both of a communication device of a fleet vehicle or a communication device of each fleet vehicle driver.

16. The apparatus of claim 2, wherein the memory includes instructions executable by the processor to:
execute the one or more analytics functions to determine one or more driver specific stop location metrics, based on at least a total time duration of each fleet vehicle driver to complete the task at one or more respective fleet vehicle stop locations, including:
determine a total time duration indicates an unauthorized break;
determine the total time duration indicates the fleet vehicle driver is in substantially continuous motion; and
determine the efficiency of the fleet vehicle driver based on the total time duration indicating the unauthorized break and based on the fleet vehicle driver being in the substantially continuous motion; and
execute the one or more analytics functions to compare at least one of the number of steps or a corresponding total time duration to at least one of a corresponding efficient step threshold or an efficient time threshold to identify an efficiency metric.

\* \* \* \* \*